United States Patent
Bradley et al.

(10) Patent No.: US 12,271,345 B2
(45) Date of Patent: Apr. 8, 2025

(54) MEDIA CONTENT MEMORY RETRIEVAL

(71) Applicant: AT&T Intellectual Property I, L.P., Atlanta, GA (US)

(72) Inventors: Nigel Bradley, Canton, GA (US); Rashmi Palamadai, Naperville, IL (US); Eric Zavesky, Austin, TX (US); Ari Craine, Marietta, GA (US); Robert Koch, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/307,627

(22) Filed: May 4, 2021

(65) Prior Publication Data

US 2022/0358088 A1 Nov. 10, 2022

(51) Int. Cl.
G06F 16/00 (2019.01)
G06F 16/14 (2019.01)
G06F 16/73 (2019.01)
G06F 16/903 (2019.01)

(52) U.S. Cl.
CPC .......... G06F 16/148 (2019.01); G06F 16/73 (2019.01); G06F 16/90335 (2019.01)

(58) Field of Classification Search
CPC ... G06F 16/73; G06F 16/148; G06F 16/90335
USPC ........................................................ 707/722
See application file for complete search history.

(56) References Cited

U.S. PATENT DOCUMENTS

| | | | | |
|---|---|---|---|---|
| 7,725,829 | B1 * | 5/2010 | Wong | G06F 16/4387 |
| | | | | 715/730 |
| 9,477,709 | B2 * | 10/2016 | Sharifi | G06F 16/9535 |
| 9,948,736 | B1 * | 4/2018 | Mengistu | H04L 43/0876 |
| 10,104,427 | B1 * | 10/2018 | Zabetian | H04N 21/8133 |
| 10,122,983 | B1 * | 11/2018 | Ross | G11B 27/10 |
| 10,176,846 | B1 * | 1/2019 | Sreedhara | G11B 27/34 |
| 10,893,328 | B2 * | 1/2021 | Venkataraman | |
| | | | | H04N 21/44226 |
| 10,979,528 | B2 * | 4/2021 | Skudlark | H04N 21/44226 |
| 11,900,346 | B1 * | 2/2024 | Eaton | G06Q 20/123 |
| 2009/0070384 | A1 * | 3/2009 | Seo | G06F 16/48 |
| 2010/0115060 | A1 * | 5/2010 | Julia | G06F 16/9535 |
| | | | | 709/219 |
| 2010/0185502 | A1 * | 7/2010 | Roberts | H04N 21/8358 |
| | | | | 707/769 |
| 2011/0173214 | A1 * | 7/2011 | Karim | G06F 16/435 |
| | | | | 707/754 |
| 2013/0038455 | A1 * | 2/2013 | Chowdhary | G01F 23/284 |
| | | | | 702/55 |
| 2015/0052115 | A1 * | 2/2015 | Sharifi | G06Q 30/02 |
| | | | | 707/722 |
| 2015/0052128 | A1 * | 2/2015 | Sharifi | G06F 16/7834 |
| | | | | 707/727 |

(Continued)

Primary Examiner — Ann J Lo
Assistant Examiner — Rezwanul Mahmood
(74) Attorney, Agent, or Firm — Guntin & Gust, PLC; Douglas Schnabel

(57) ABSTRACT

Aspects of the subject disclosure may include, for example, a media consumption database that stores data elements describing conditions under which electronic media content is consumed by a user on an electronic device. A search of the media consumption database based on at least a portion of the conditions may result in at least a portion of the electronic media content to be re-presented to an electronic device of the user Other embodiments are disclosed.

20 Claims, 19 Drawing Sheets

(56) References Cited

U.S. PATENT DOCUMENTS

| | | | |
|---|---|---|---|
| 2015/0066897 A1* | 3/2015 | Vronay | G06F 16/435 |
| | | | 707/710 |
| 2015/0074700 A1* | 3/2015 | Danovitz | H04N 21/26283 |
| | | | 725/112 |
| 2015/0095329 A1* | 4/2015 | Sanio | G06F 16/48 |
| | | | 707/732 |
| 2015/0363061 A1* | 12/2015 | de Nigris, III | H04N 21/8113 |
| | | | 715/717 |
| 2016/0142783 A1* | 5/2016 | Bagga | H04N 21/47214 |
| | | | 725/47 |
| 2016/0292269 A1* | 10/2016 | O'Driscoll | G06F 16/632 |
| 2017/0228774 A1* | 8/2017 | Sallas | G06Q 30/0255 |
| 2017/0235768 A1* | 8/2017 | Amrutkar | G06F 3/04842 |
| | | | 707/722 |
| 2017/0300570 A1* | 10/2017 | Chiarandini | G06F 16/71 |
| 2017/0366848 A1* | 12/2017 | Shaw | H04N 21/25435 |
| 2020/0245032 A1* | 7/2020 | Murtaza | H04N 21/234309 |
| 2020/0311146 A1* | 10/2020 | Guo | G06F 16/9532 |
| 2020/0364588 A1* | 11/2020 | Knox | G06V 40/20 |
| 2021/0034714 A1* | 2/2021 | Jackson | G06Q 50/184 |
| 2021/0149696 A1* | 5/2021 | Munson | H04L 9/083 |
| 2021/0311910 A1* | 10/2021 | Calveley | G11B 27/031 |
| 2021/0349883 A1* | 11/2021 | Majumdar | H04N 21/6582 |
| 2021/0385533 A1* | 12/2021 | Daly | H04N 21/41407 |
| 2022/0335476 A1* | 10/2022 | Abdel-Wahab | G06Q 30/0255 |
| 2022/0345778 A1* | 10/2022 | Bradley | H04N 21/8541 |
| 2022/0358088 A1* | 11/2022 | Bradley | G06F 16/90335 |
| 2023/0401274 A1* | 12/2023 | Denninghoff | G06Q 30/0251 |

* cited by examiner

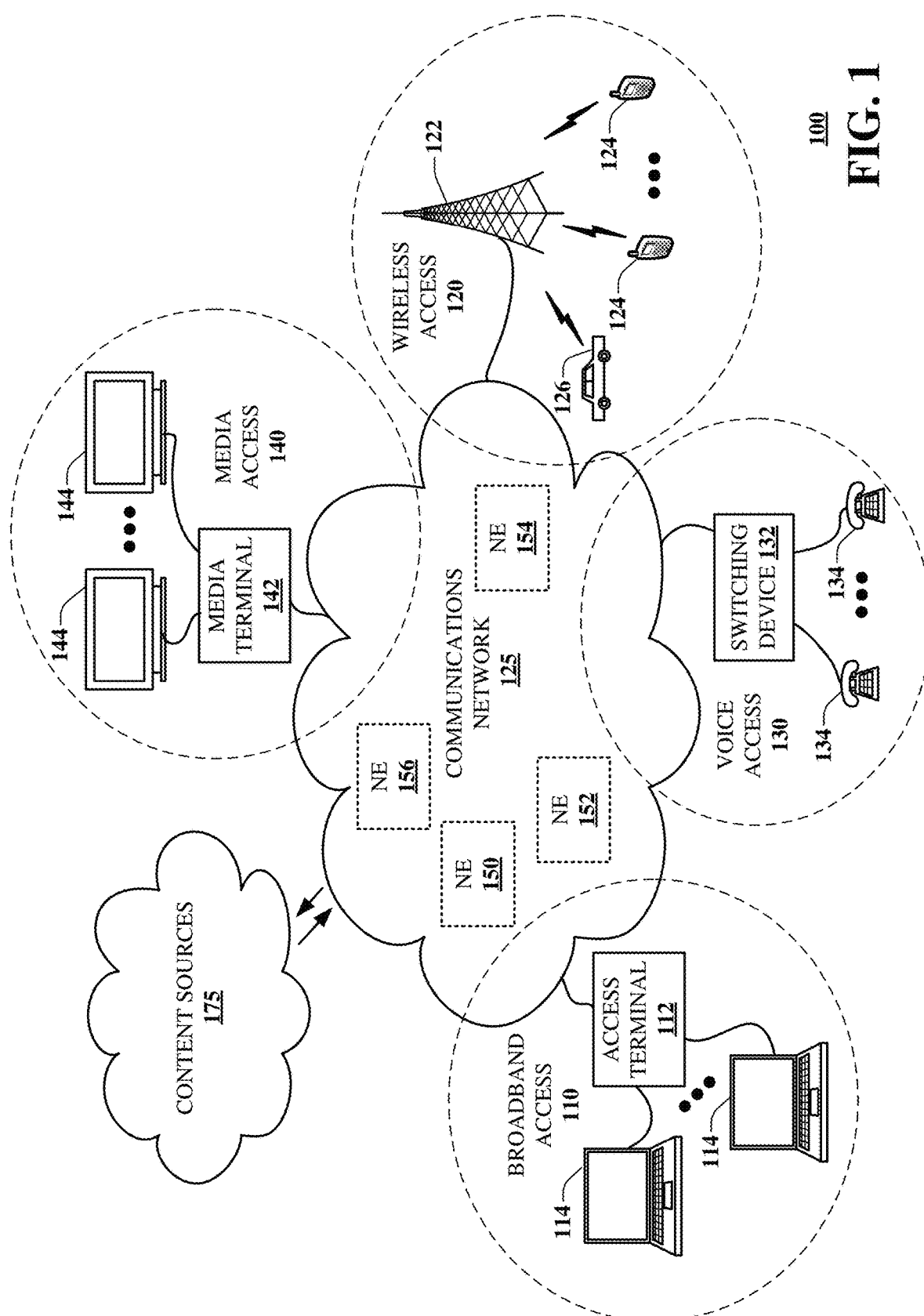

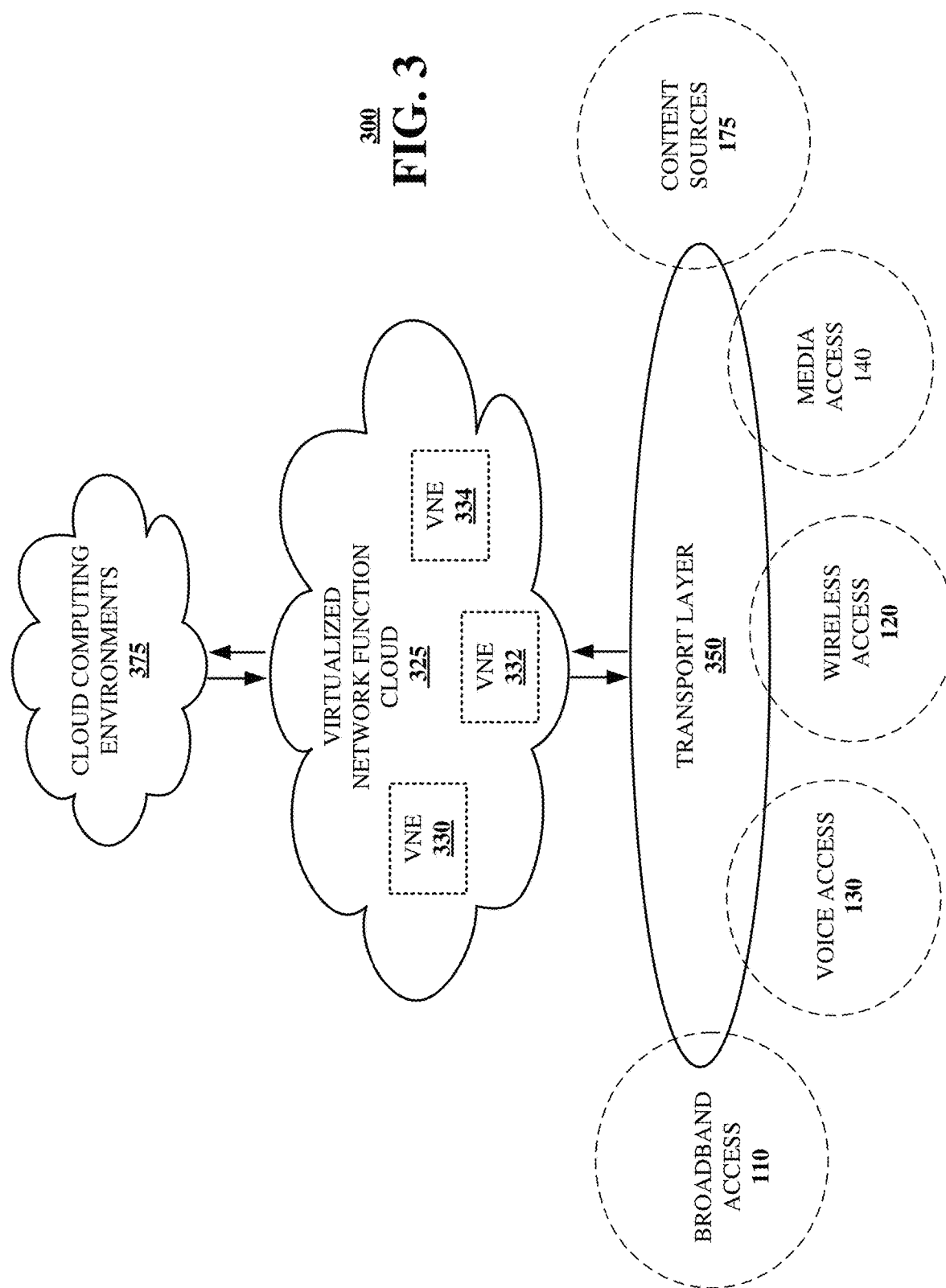

MEDIA CONTENT MEMORY RETRIEVAL

FIELD OF THE DISCLOSURE

The subject disclosure relates to the retrieval of electronic media content.

BACKGROUND

Users regularly consume media content on electronic devices. For example, a user may listen to audio content or view video content on a smartphone or television monitor. If a user wants to consume the same media content again at a later date, but cannot remember the title, they typically have limited options. For example, a user may comb through a browsing history in an attempt to find a previously viewed video.

BRIEF DESCRIPTION OF THE DRAWINGS

Reference will now be made to the accompanying drawings, which are not necessarily drawn to scale, and wherein:

FIG. 1 is a block diagram illustrating an exemplary, non-limiting embodiment of a communications network in accordance with various aspects described herein.

FIG. 3 is a block diagram illustrating an example, non-limiting embodiment of a virtualized communication network in accordance with various aspects described herein.

DETAILED DESCRIPTION

Figure 2A:
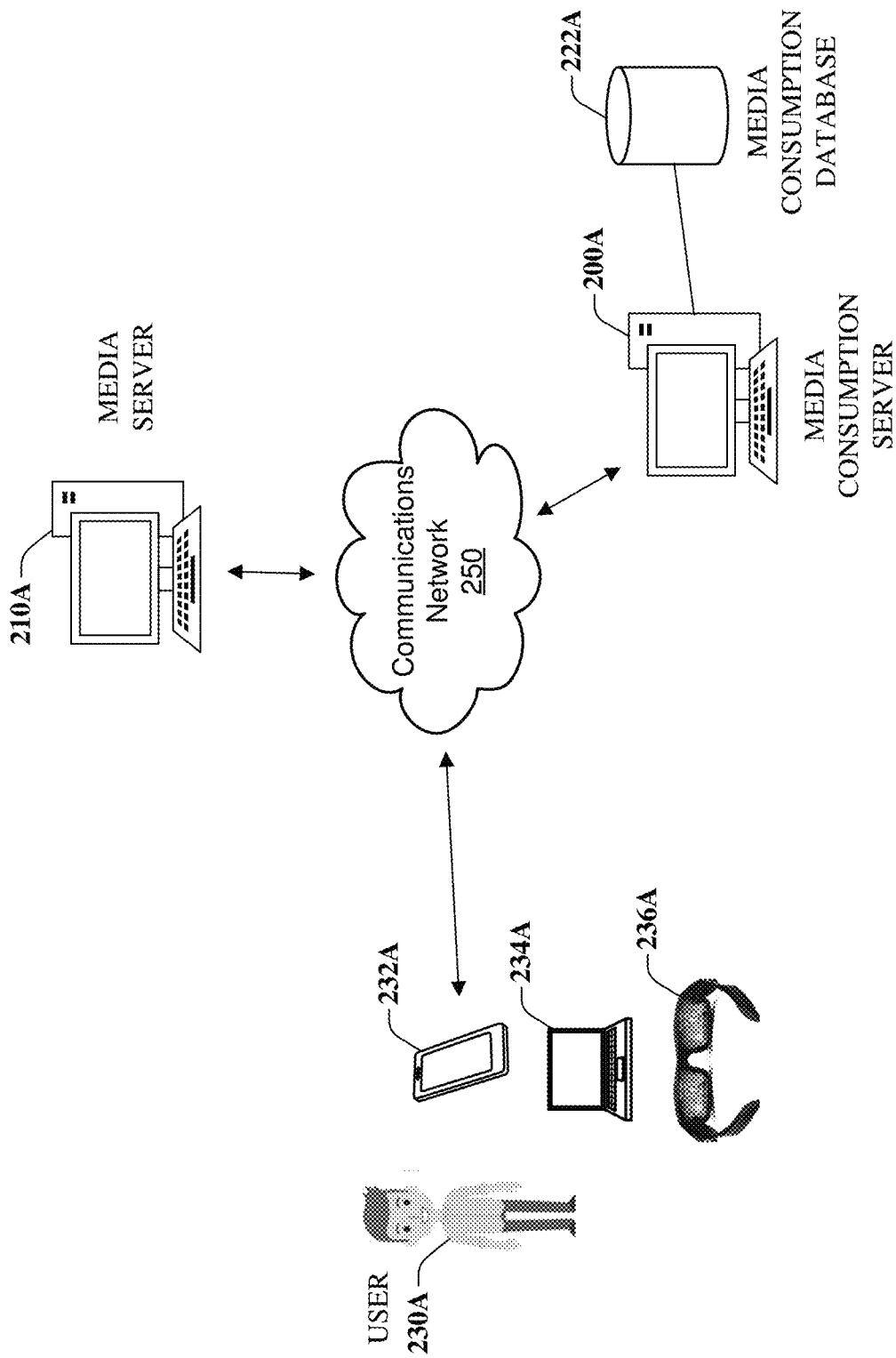
FIG. 2A is a block diagram illustrating an example, non-limiting embodiment of a media retrieval system interacting with a user's electronic devices in accordance with various aspects described herein.

The subject disclosure describes, among other things, illustrative embodiments for a system that provides the ability to recall previously consumed media content by submitting conditions under which the media content was initially consumed on an electronic device. Optionally, a proxy recall may be submitted wherein a user recalls media content consumed by another party, possibly with the other party's permission. Other embodiments are described in the subject disclosure.

One or more aspects of the subject disclosure include a device having a processing system including a processor; and a memory that stores executable instructions that, when executed by the processing system, facilitate performance of operations. The operations may include receiving first information describing at least one condition under which a user consumed electronic media content on an electronic device; storing one or more data elements that describe the first information; receiving a search request that includes at least a portion of the first information; and in response to the search request, causing at least a portion of the electronic media content to be retrieved and presented to the user.

In additional aspects of the disclosure, the first information may include location information describing the location of the electronic device when the electronic media content was consumed on the electronic device. The location information may be provided in any manner. For example, location information may be sensed by the electronic device, retrieved from a location-based application, provided at least in part by a social media service, or the like. The first information may also include a timestamp describing the time at which the electronic media content was consumed on the electronic device.

In still additional aspects of the disclosure, the first information may be derived from direct communication between the electronic device and another electronic device. The operations may further include receiving metadata describing the media content, and the search request may include at least a portion of the first information and at least a portion of the metadata.

One or more aspects of the subject disclosure include a non-transitory machine-readable medium, having instructions stored thereon that, when executed by a processing system including a processor, facilitate performance of operations. The operations may include receiving first information describing at least one condition under which a user consumed electronic media content on an electronic device; storing one or more data elements that describe the first information; receiving a search request that includes at least a portion of the first information; and in response to the search request, causing at least a portion of the electronic media content to be retrieved and presented to the user.

One or more aspects of the subject disclosure include method that may include receiving, by a processing system including a processor, first information describing at least one condition under which a user consumed electronic media content on an electronic device; storing, by the processing system, one or more data elements that describe the first information; receiving, by the processing system, a search request that includes at least a portion of the first information; and in response to the search request, causing, by the processing system, at least a portion of the electronic media content to be retrieved and presented to the user.

Referring now to FIG. 1, a block diagram is shown illustrating an example, non-limiting embodiment of a system 100 in accordance with various aspects described herein. For example, system 100 can facilitate in whole or in part the retrieval of electronic media content based at least in part on conditions under which the electronic media content was consumed on an electronic device. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

As described further below, in various embodiments, communications network 125 may facilitate storing data elements describing electronic media content and/or conditions under which the electronic media content was consumed by an electronic device. In some embodiments, the data elements are stored with a network element, and in other embodiments, the data elements are stored outside communications network 125. These and other embodiments are described further below.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a media retrieval system interacting with a user's electronic devices in accordance with various aspects described herein. The media retrieval system of FIG. 2A may include a media consumption server 200A and an associated media consumption database 222A. In some embodiments, the media retrieval system also includes a media server (e.g., media server 210A) that provides electronic media content.

Media server 210A is shown separate from communications network 250 in FIG. 2A; however, in some embodiments, media server 210A is included within communications network 250. For example, one or more network elements may include media storage and/or streaming capabilities, and may source electronic media content to an electronic device.

In some embodiments, electronic media content may be provided to an electronic device by media server 210A for consumption by a user 230A. The electronic media content may include any type of media. For example, electronic media content may include text, images, video, audio, augmented reality content, virtual reality content, or any other type or combination of types of media. The electronic media content may be stored, streaming, broadcast, or presented in any manner. The electronic media content may be consumed on any type of electronic device. For example, electronic media content may be consumed on a mobile device 232A such a smartphone or tablet computer, a laptop computer 234A, a personal viewing device such as a projection glasses 236A, or the like.

In some embodiments, electronic media content may be media that previously existed that is accessed via a media server, such as Internet content accessed via webpages or the like. In further embodiments, electronic media content may be media that is created in real-time that may or may not be recorded by the source for future recall and retrieval, such as live-streamed content. In still further embodiments, electronic media content may be media that is created by a user (e.g., user 230A) in real-time, such as using a camera or video camera (e.g., body camera, camera-equipped eyeglasses, etc.).

In some embodiments, when a user consumes electronic media content using an electronic device, the electronic device may make a record of conditions under which the electronic media was consumed. For example, mobile device 232A may be equipped with one or more sensors detect conditions that exist at the time of media consumption. Examples include sensors that may detect time, location, other people nearby (via their devices), motion/speed sensors, and others. In some embodiments, the record of these conditions may be stored as data elements in media consumption database 222A. Over time, a large database of these data elements may be created that describes the conditions under which a particular user has consumed various types and quantities of electronic media content.

In some embodiments, metadata describing the electronic media content that was consumed is stored along with the data elements described above. For example, text-based media descriptors may be stored as metadata. These descriptors are metadata that include text that describes the electronic media content (and that can later be used to help recall the electronic media content). In some embodiments, the metadata may be derived from the content of the electronic media content itself (such as media that is text from a web page), or metadata that is sent with the electronic media content when it is consumed (such as tags that describe what an image looks like if the media is an image), or metadata that is generated by the media consumption database (such as a description of a video scene that is generated using video analysis techniques). In some embodiments, the metadata is timestamped to aid in recall portions of the electronic media content. These and other embodiments are described further below.

In some embodiments, the electronic media content, or a portion thereof, is stored along with the data elements and/or the metadata. For example, during consumption of electronic media content (or after consumption of electronic media content) by an electronic device such as laptop computer 234A, the electronic media, the data elements describing conditions under which the electronic media content was consumed, and the metadata describing the electronic media content may be stored in media consumption database by media consumption server 200A. The stored electronic media content may be media content provided to a user by a media server such as media server 210A, or may be media content generated by a user (e.g., user 230A using a camera in mobile device 232A).

Associating timestamps, timed sensor readings, and metadata with consumed (or created) electronic media content allows media consumption database 222A to build up a timeline of consumed media that is later searchable for recall. Accordingly, after initial consumption (or creation) of electronic media content, a user may recall all or a portion of the electronic media content by querying media consumption database 222A using information describing the conditions under which the electronic media content was initially consumed or created, metadata describing the electronic media content, or any combination. For example, a user may query media consumption database 222A for a webpage that was viewed on a particular day, a video that was viewed on a phone while commuting to work, or a social media post that created and made last week. These and other embodiments are further described below.

Figure 2B:
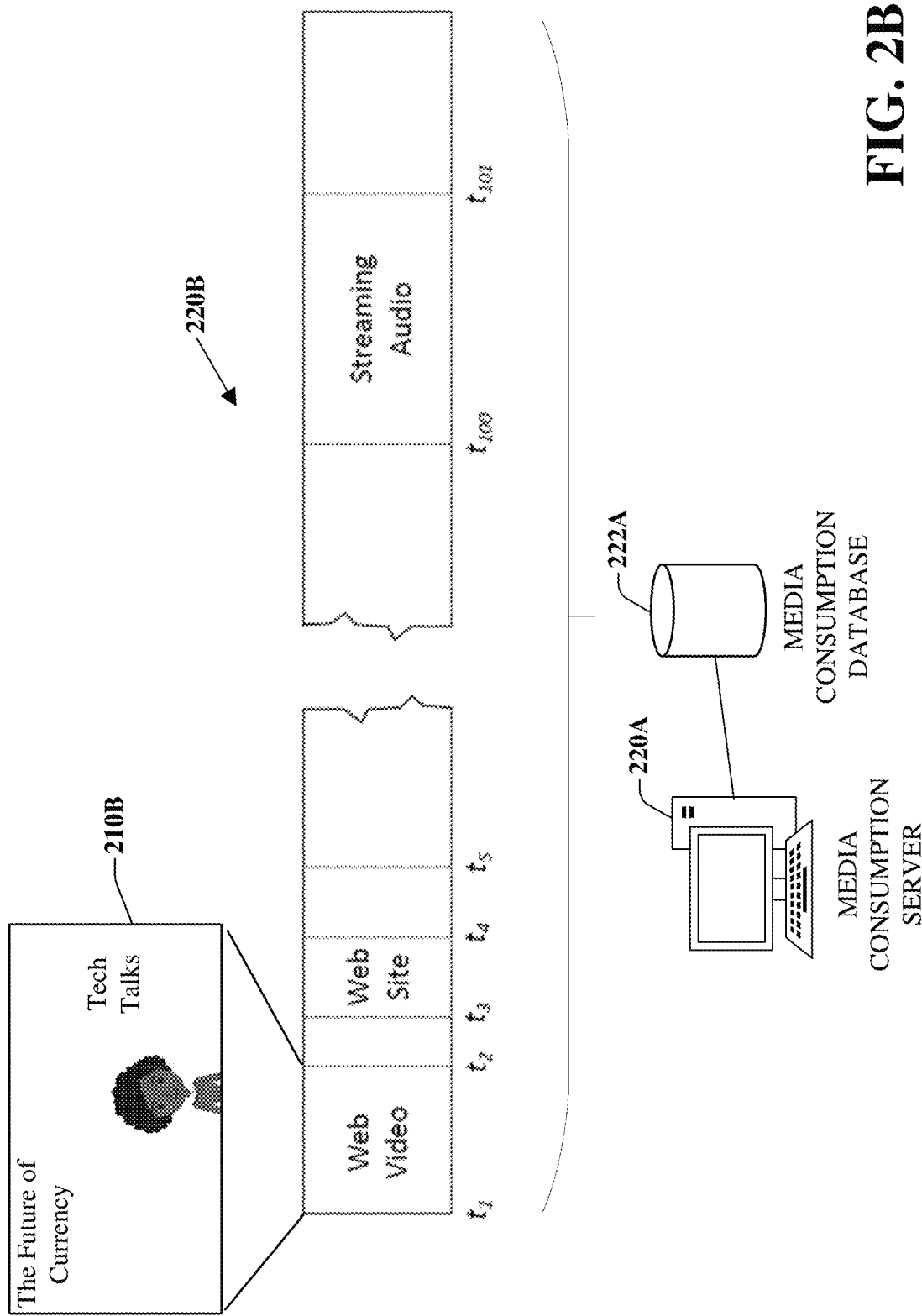
FIGS. 2B-2F are block diagrams illustrating example, non-limiting embodiments of electronic media content presented to an electronic device in accordance with various aspects described herein.

FIG. 2B is a block diagram illustrating an example, non-limiting embodiment of electronic media content presented to an electronic device in accordance with various aspects described herein. FIG. 2B shows a timeline 220B of electronic media content consumed by a user on one or more electronic devices. For example, a video 210B is viewed on a webpage between times t1 and t2, a website is visited between times t3 and t4, and streaming audio is consumed between times t100 and t101. The example video 210B is a "tech talk" about the future of currency.

In some embodiments, the electronic device used to consume web video 210B may include a media consumption application that records the consumed video and sends it to the user's media consumption database record within media consumption database 222A, along with any metadata and timestamped metadata that was delivered to the user with the video. The media consumption application may also analyze the video using known techniques to create metadata describing the video, including descriptors of scenes viewed. This timed metadata generated via video analysis may also be stored in the user's media consumption database record within media consumption database 222A.

In some embodiments, a single record is created in media consumption database 222A for a particular item of consumed electronic media content. For example, one record may be created describing video 210B and the conditions under which it was consumed. In other embodiments, multiple records may be created for a particular item of consumed electronic media content. For example, multiple records may be created for video 210B representing times between t1 and t2. These and other embodiments are described further below.

Figure 2C:
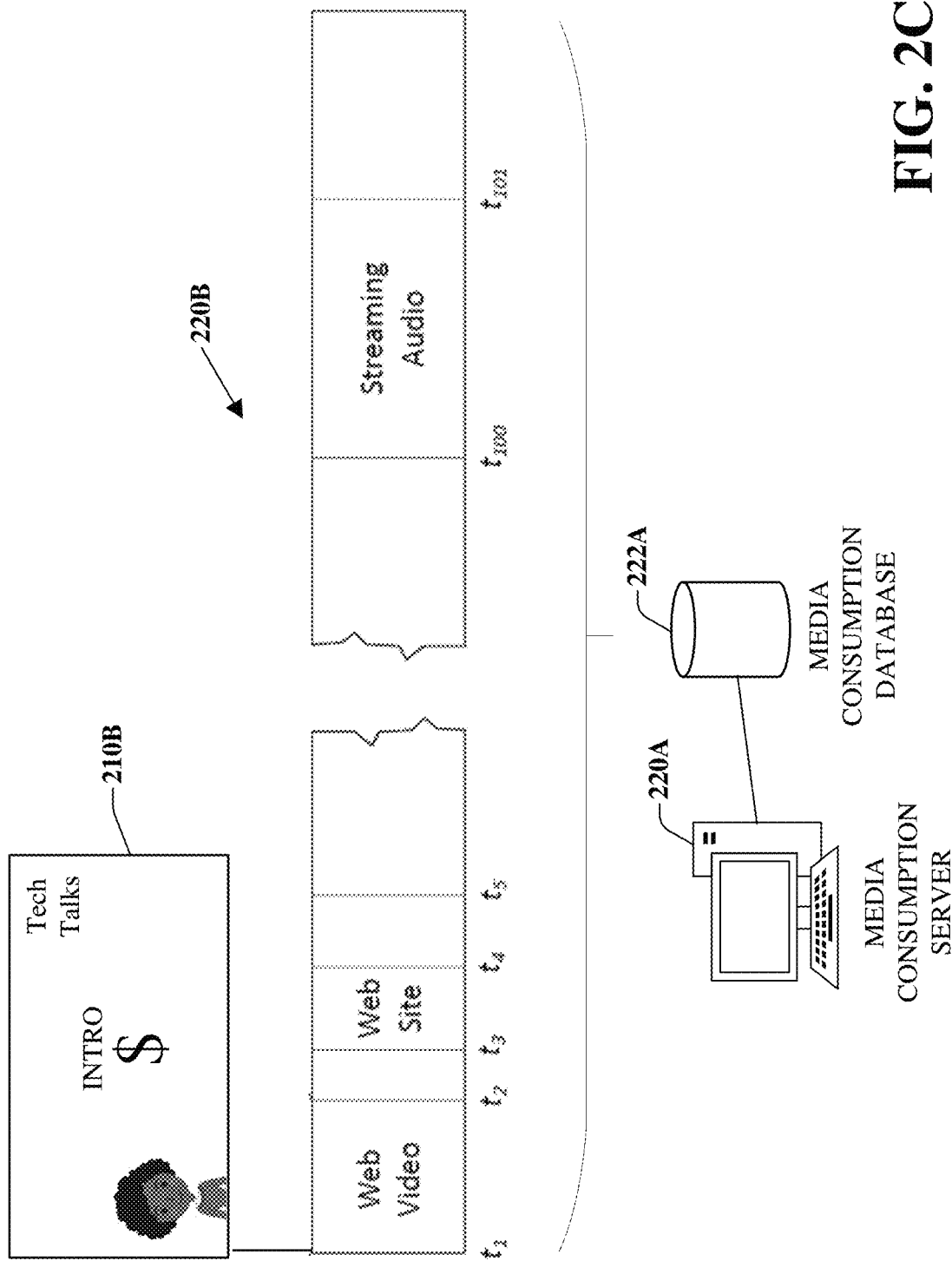

FIG. 2C is a block diagram illustrating an example, non-limiting embodiment of electronic media content presented to an electronic device in accordance with various aspects described herein. FIG. 2C shows a still image from near the beginning of video 210B (at t1 or shortly thereafter). In some embodiments, a media consumption application may create a media consumption database record that includes media metadata and data elements describing the conditions under which the electronic media content was consumed (also referred to herein as "condition data"). Metadata and condition data for the example shown in FIG. 2C may be:

Media Metadata
Time: t1
Title: The Future of Currency
Source: Tech Talks
Creator: techtalks123xyz.com
Link: techtalks123xyz.com/123456
Scene Descriptors: woman, speaker
Chapter: Introduction
Condition Data
Location: Home, 123 Maple Ave, Reno, NV
Companions: None
Speed: 0 MPH The above media metadata and condition data may be combined into a media consumption record and stored in media consumption database 222A. Although specific types of metadata and condition data are given as examples above, any type of metadata and condition may be included in a media consumption record. Further, in some embodiments, all or a portion of video 210B may be stored in media consumption database 222A. For example, in some embodiments, the entire video 210B is stored, and in other embodiments, still images from selected portions of video 210B are stored.

Figure 2D:
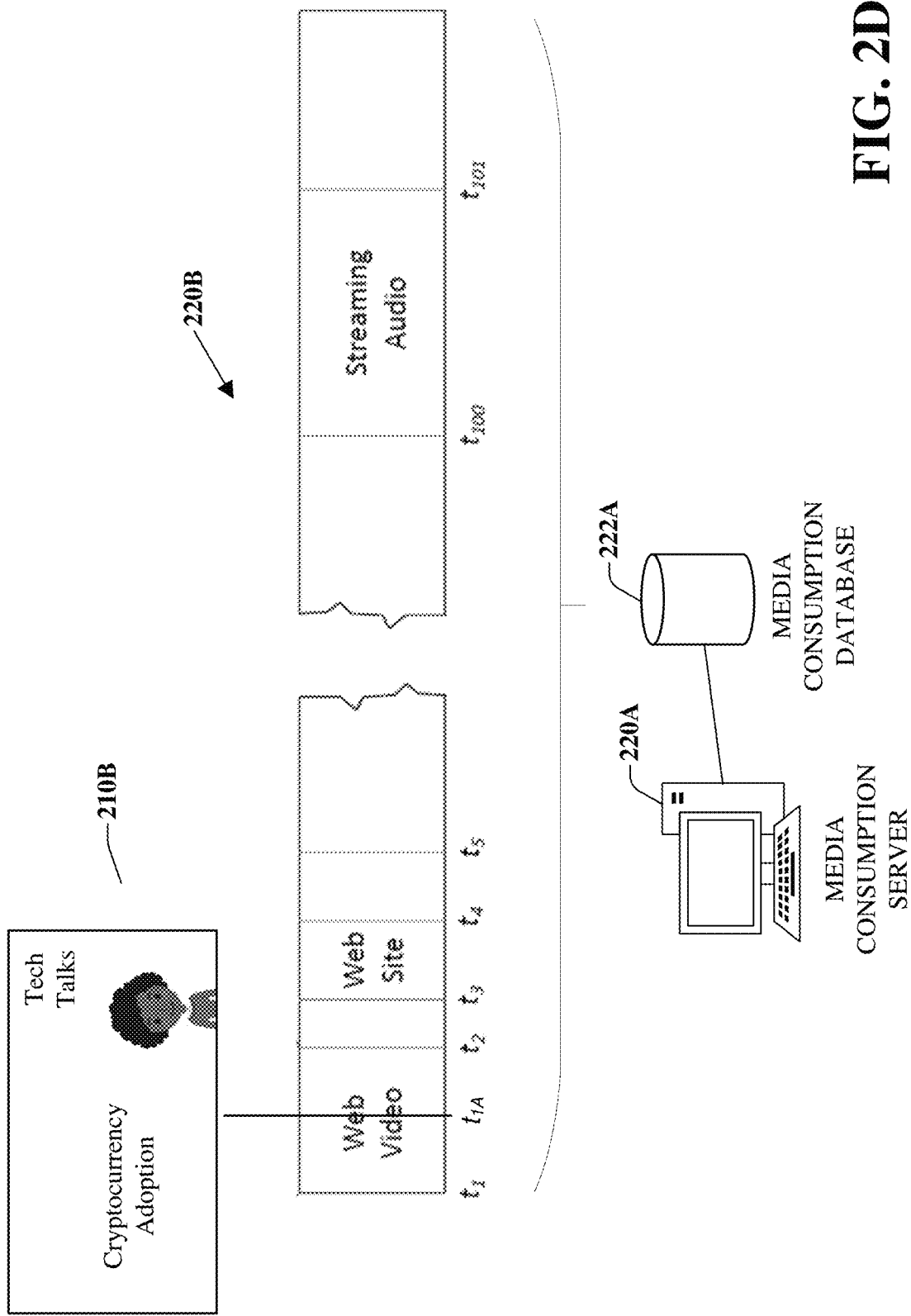

FIG. 2D is a block diagram illustrating an example, non-limiting embodiment of electronic media content presented to an electronic device in accordance with various aspects described herein. FIG. 2D shows a still image from a different time in video 210B (at t1A). In some embodiments, a media consumption application may create a media consumption database record that includes media metadata and data elements describing the conditions under which the electronic media content was at time t1A. Metadata and condition data for the example shown in FIG. 2D may be:

Media Metadata
Time: t1A
Title: The Future of Currency
Source: Tech Talks

Creator: techtalks123xyz.com
Link: techtalks123xyz.com/123456
Scene Descriptors: woman, speaker
Chapter: Cryptocurrency Adoption
Condition Data
Location: Home, 123 Maple Ave, Reno, Nev.
Companions: None
Speed: 0 MPH The above media metadata and condition data may be combined into a media consumption record and stored in media consumption database 222A. In some embodiments, a portion of video 210B is stored in media consumption database 222A along with the metadata and condition data. For example, a still image or short clip of video corresponding to time t1 may be stored along with the metadata and condition data.

Figure 2E:
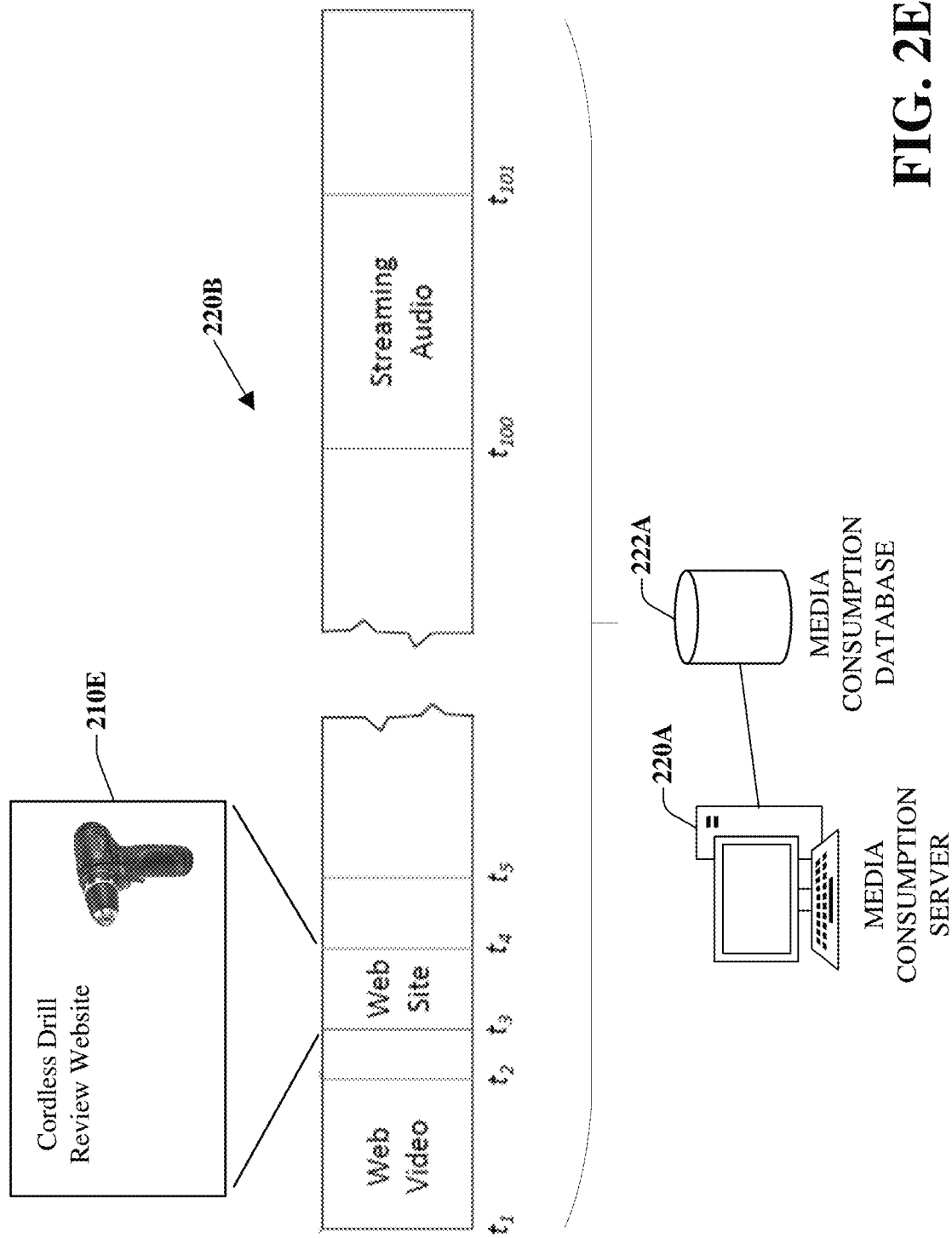

FIG. 2E is a block diagram illustrating an example, non-limiting embodiment of electronic media content presented to an electronic device in accordance with various aspects described herein. FIG. 2E shows a website 210E viewed at time t3. In some embodiments, content from website 210 (e.g., text, pictures, links, multimedia content) may be stored in media consumption database 222A during or after consumption. Further, a media consumption application may create a media consumption database record that includes media metadata and data elements describing the conditions under which the electronic media content was at time t3. In the example of FIG. 2E, website 210 includes a review of cordless drills. Metadata and condition data for the example shown in FIG. 2E may be:

Media Metadata
Time: t3
Image: Drillblaster 1000
Condition Data
Location: Home, 123 Maple Ave, Reno, NV
Companions: None
Speed: 0 MPH The above media metadata and condition data may be combined into a media consumption record and stored in media consumption database 222A. Further, as described above, any amount or type of content from website 210 may also be stored in media consumption database 222A.

Figure 2F:
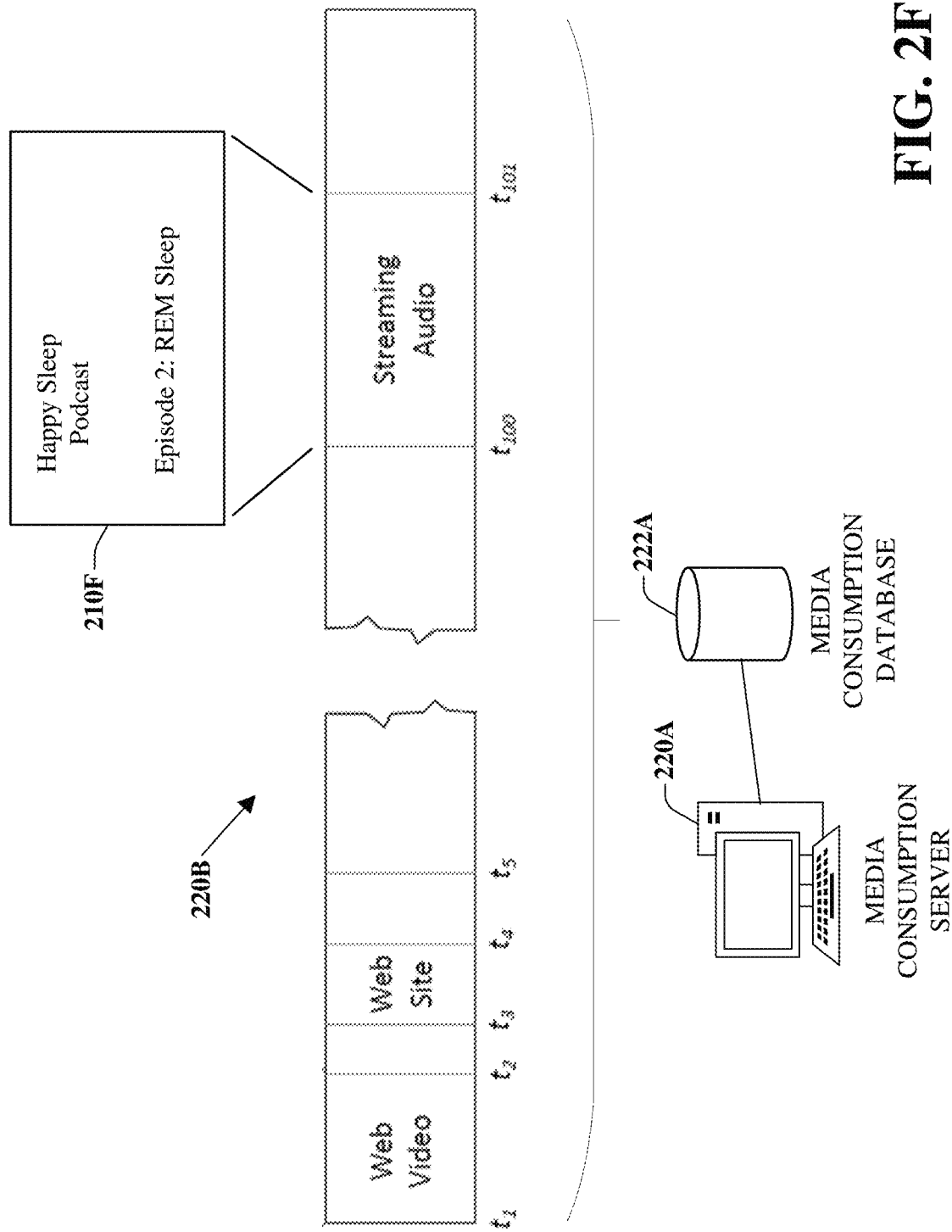

FIG. 2F is a block diagram illustrating an example, non-limiting embodiment of electronic media content presented to an electronic device in accordance with various aspects described herein. FIG. 2F shows an example of streaming audio at 210F. The example streaming audio is a recorded podcast; however any audio, recorded, streaming, or otherwise, may be consumed, tagged, and stored without limitation. For example, in some embodiments, audio content may include music, personal notes, or any other audio content from any source. In some embodiments, the audio content is stored in media consumption database 222A as it exists. In other embodiments, all or a portion of audio content may be converted to text that is then stored in media consumption database 222A. For example, at time t100, converted text may include "Now let's talk about REM sleep." Metadata and condition data for the example shown in FIG. 2E may be:

Media Metadata
Time: t100
Title: Episode 2: REM Sleep
Source: Happy Sleep Podcast
Condition Data
Location: 1-81 Southbound, Roanoke, VA
Companions: Susie
Speed: 65 MPH The above media metadata and condition data may be combined into a media consumption record and stored in media consumption database 222A. In some embodiments, a portion of audio 210F is stored in media consumption database 222A along with the metadata and condition data. For example, a short clip of audio corresponding to time t100 may be stored along with the metadata and condition data.

Figure 2G:
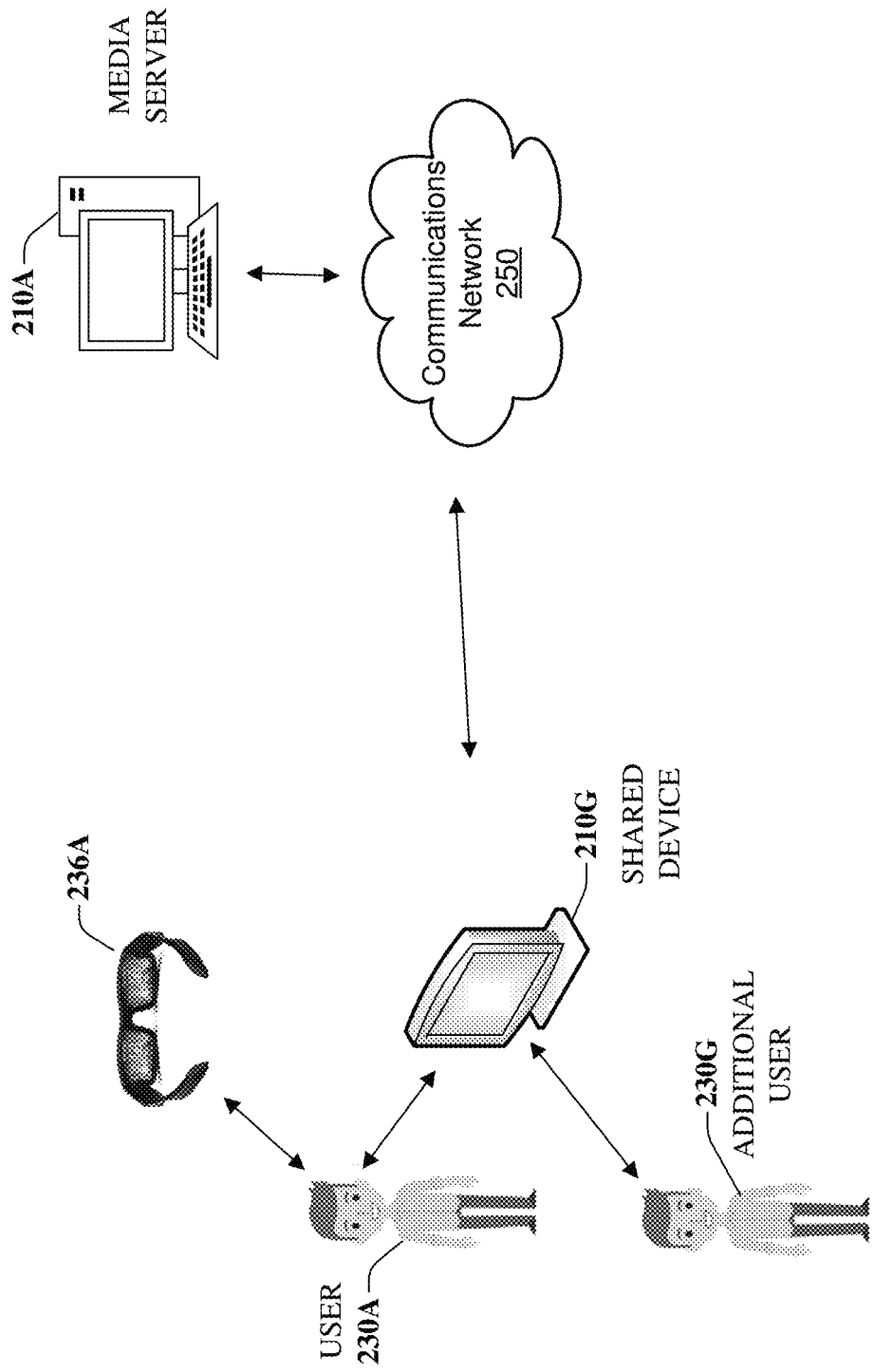
FIG. 2G is a block diagram illustrating an example, non-limiting embodiment of electronic media content being presented on a shared electronic device in accordance with various aspects described herein.

FIG. 2G is a block diagram illustrating an example, non-limiting embodiment of electronic media content being presented on a shared electronic device in accordance with various aspects described herein. In the example of FIG. 2G, user 230A consumes electronic media content on shared device 210G. Shared device 210G may be any electronic device capable of consuming electronic media content that may be viewed by multiple users (e.g., user 230A and additional user 230G). For example, shared device 210G may be a neighbor's television, a public display such as an electronic billboard or a video display at a sporting or other event.

In some embodiments, the electronic media content consumed on shared device 210G may be recorded and stored in media consumption database 222A using a user's electronic device. For example, a wearable camera such as a camera embedded in eyeglasses 236A may be used to record electronic media content consumed on shared device 210G. In other embodiments, a user's electronic device may be in communication with the shared device, such as the neighbor's TV and may receive a synchronized stream of the electronic media content. The user's device may then store the shared electronic media content, metadata, and condition data in media consumption database 222A.

Figure 2H:
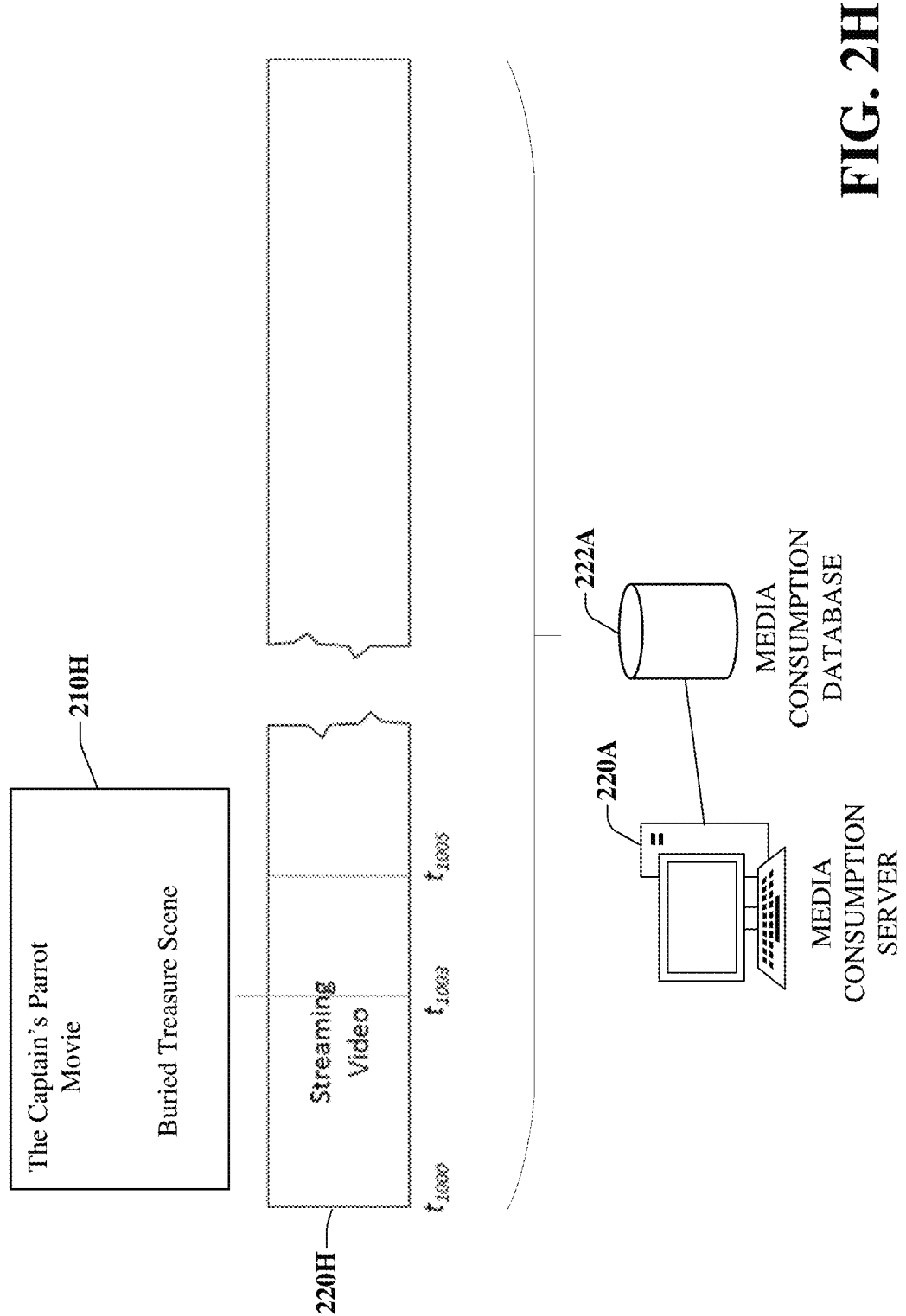
FIG. 2H is a block diagram illustrating an example, non-limiting embodiment of electronic media content being presented to an electronic device in accordance with various aspects described herein.

FIG. 2H is a block diagram illustrating an example, non-limiting embodiment of electronic media content being presented to an electronic device in accordance with various aspects described herein. FIG. 2H shows a timeline 220H of streaming video consumed on a shared device such as shared device 210G (FIG. 2G). At time t1003, a particular scene (the "Buried Treasure Scene") from a movie ("The Captain's Parrot Movie") is being consumed on the shared device. In some embodiments, a user's device or the shared device may create a media consumption database record that includes media metadata and data elements describing the conditions under which the electronic media content was consumed. Metadata and condition data for the example shown in FIG. 2H may be:

Media Metadata
Time: t1003
Title: The Captain's Parrot Movie
Source: The ABC Streaming Service
Scene Descriptors: Buried Treasure Scene, Marooned Pirate
Condition Data
Location: Fred's House, 125 Maple Ave, Reno, NV
Companions: Fred
Speed: 0 MPH The above media metadata and condition data may be combined into a media consumption record and stored in media consumption database 222A. Further, in some embodiments, all or a portion of the streaming electronic media content 210H may be stored in media consumption database 222A. For example, in some embodiments, the entire Captain's Parrot Movie is stored, and in other embodiments, the Buried Treasure Scene or still images from the Buried Treasure Scene are stored.

Figure 2I:
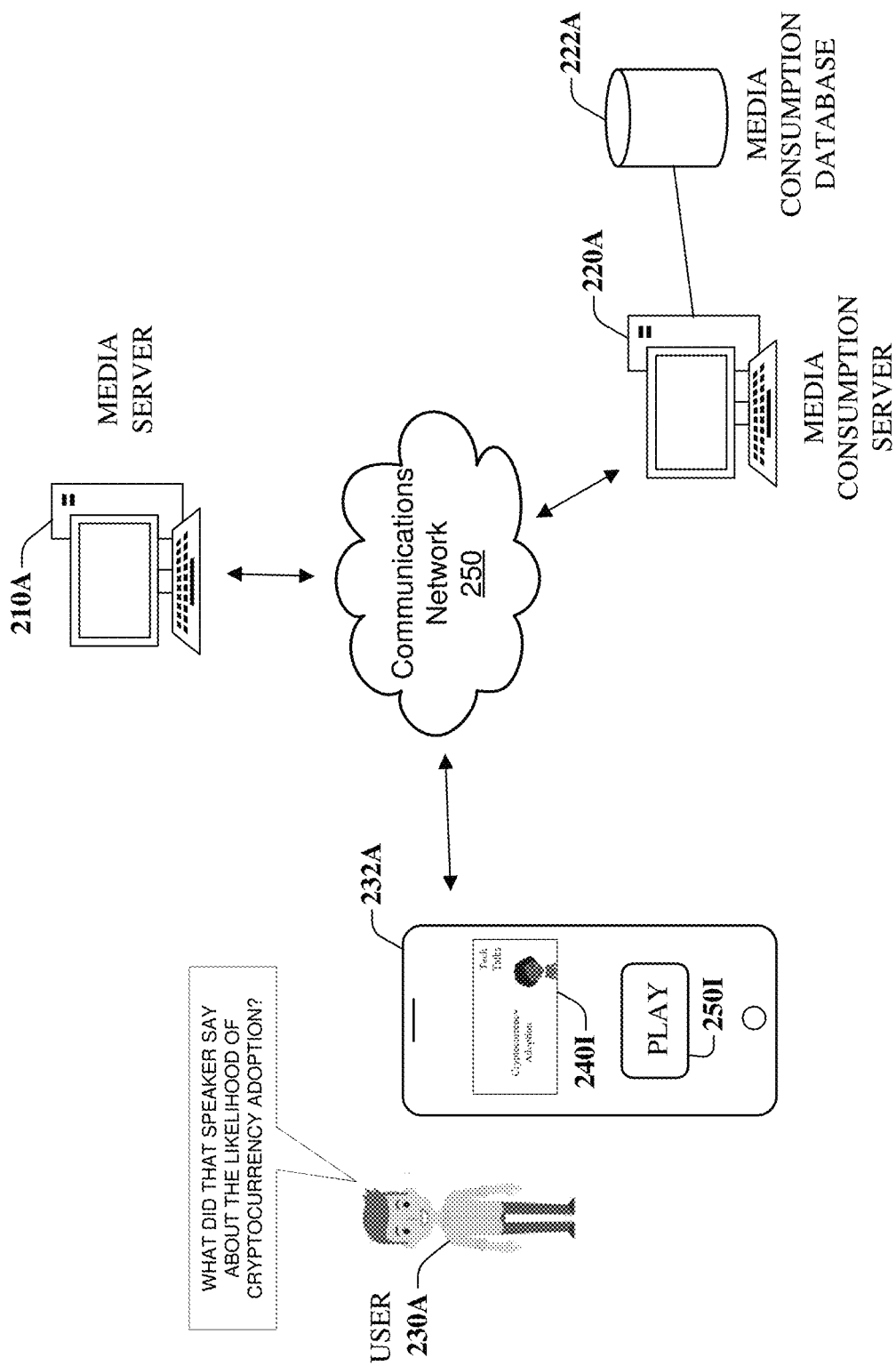
FIGS. 2I-2L are block diagrams illustrating example, non-limiting embodiments of a media retrieval system interacting with a user's electronic devices in accordance with various aspects described herein.

FIG. 2I is a block diagram illustrating an example, non-limiting embodiment of a media retrieval system interacting with a user's electronic device in accordance with various aspects described herein. As shown in FIG. 2I, user 230A may wish to recall something about the electronic media content they consumed in the past or may want to re-present the media. In some embodiments, the user may submit a search request using whatever pieces of memory they have about the media, including what it contained, what it was about, or the conditions under which they originally consumed it. In some embodiments, a virtual assistant, such as an application on a smartphone, may be used to initiate the search via a speech interface or other interface. The search may then be executed on media consumption server 220A by searching media consumption database 222A. For example, an index of the user's media consumption database using the search criteria may be compared with the stored electronic media content, metadata, and condition data or any combination thereof.

In the example of FIG. 2I, user 230A provides the query "what did that speaker say about the likelihood of cryptocurrency adoption?" A search of media consumption database 222A returns video clip 240I which corresponds to the clip from time t1A described above with reference to FIG. 2D. In some embodiments, the pertinent media for the search is recalled and playback options 250I are presented for the media to be presented from either media server 210A or media consumption server 220A to the user's electronic device. Accordingly, the user has been able to search all electronic media content that they have consumed in the past within various contexts, using whatever pieces of conditions existed at the time of viewing that they can recall.

In some embodiments, media consumption server learns from previous search requests. For example, and artificial intelligence (AI) machine may use machine learning techniques to learn patterns of previous searches made by users. In one example, a particular user may consistently confuse a first location with a second location, and the AI machine may learn to perform a search for both the first location and the second location when either is specified in a search query. Also for example, a particular user may consistently confuse a first actor's name with a second actor's name, and the AI machine may learn to perform a search for both actors' names when either is specified in a search query. In yet another example, a particular user may consistently select electronic media content that was originally consumed at Fred's house after performing a query for electronic media content consumed at Frank's house. In these embodiments, the AI machine may learn to perform a search for both Fred's house and Frank's house when either is specified in a search query.

Figure 2J:
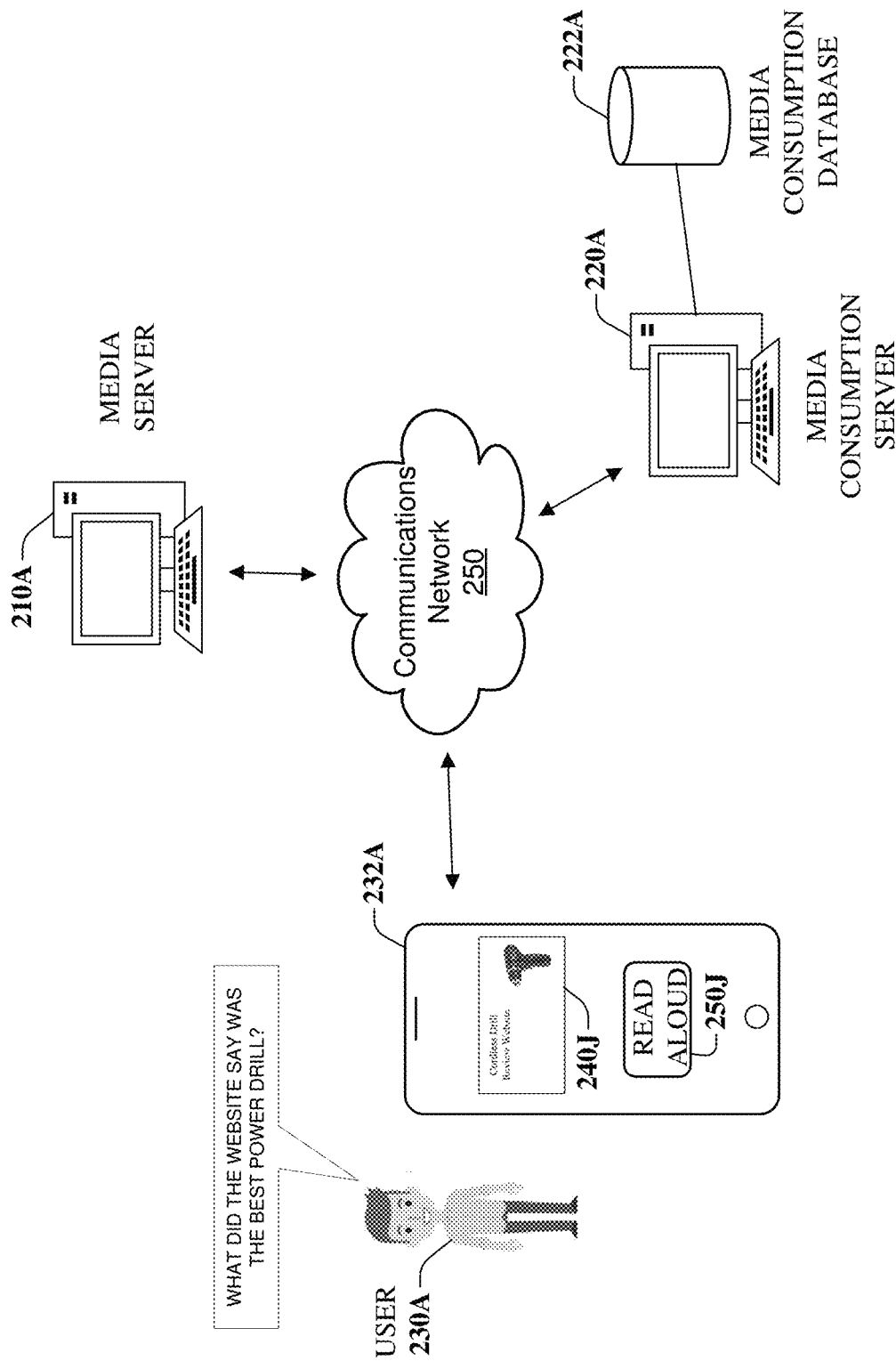

FIG. 2J is a block diagram illustrating an example, non-limiting embodiment of a media retrieval system interacting with a user's electronic device in accordance with various aspects described herein. The example of FIG. 2J is similar to the example of FIG. 2I with user 230A presenting the search query "what did the website say was the best power drill?" A search of media consumption database 222A returns website 240J which corresponds to the website 210E from time t3 described above with reference to FIG. 2E. In some embodiments, the pertinent media for the search is recalled and playback options 250J are presented for the media to be presented from either media server 210A or media consumption server 220A to the user's electronic device. Accordingly, the user has been able to search all electronic media content that they have consumed in the past within various contexts, using whatever pieces of conditions existed at the time of viewing that they can recall.

Figure 2K:
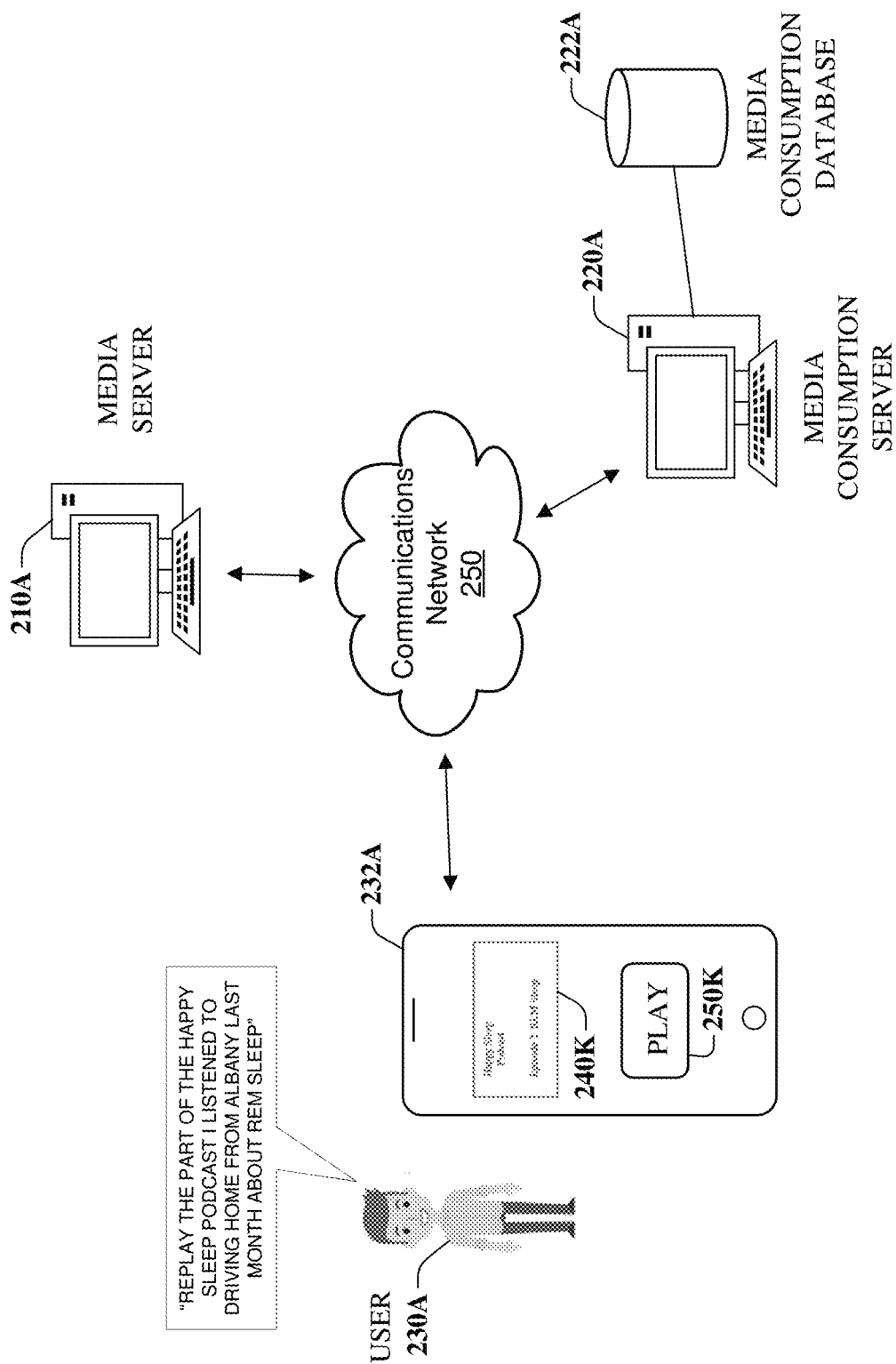

FIG. 2K is a block diagram illustrating an example, non-limiting embodiment of a media retrieval system interacting with a user's electronic device in accordance with various aspects described herein. The example of FIG. 2K is similar to the example of FIG. 2I with user 230A presenting the search query "replay the part of the happy sleep podcast I listened to driving home from Albany last month about REM sleep." A search of media consumption database 222A returns podcast 240K which corresponds to the podcast 210F from time t100 described above with reference to FIG. 2F. In some embodiments, the pertinent media for the search is recalled and playback options 250K are presented for the media to be presented from either media server 210A or media consumption server 220A to the user's electronic device. Accordingly, the user has been able to search all electronic media content that they have consumed in the past within various contexts, using whatever pieces of conditions existed at the time of viewing that they can recall.

Figure 2L:
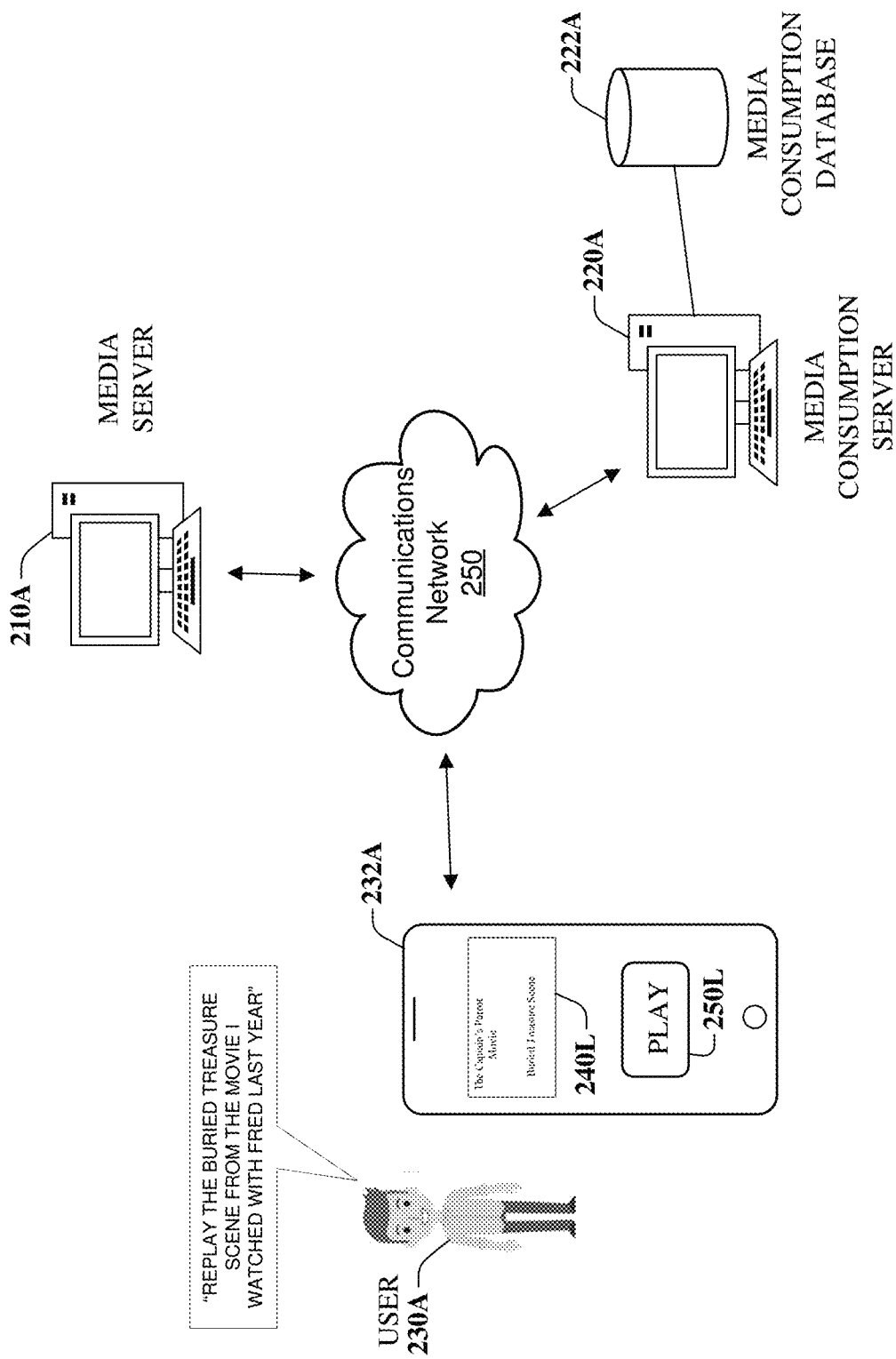

FIG. 2L is a block diagram illustrating an example, non-limiting embodiment of a media retrieval system interacting with a user's electronic device in accordance with various aspects described herein. The example of FIG. 2L is similar to the example of FIG. 2I with user 230A presenting the search query "replay the buried treasure scene from the movie I watched with Fred last year." A search of media consumption database 222A returns scene 240L which corresponds to the buried treasure scene 210H from time t1003 described above with reference to FIG. 2H. In some embodiments, the pertinent media for the search is recalled and playback options 250L are presented for the media to be presented from either media server 210A or media consumption server 220A to the user's electronic device. Accordingly, the user has been able to search all electronic media content that they have consumed in the past within various contexts, using whatever pieces of conditions existed at the time of viewing that they can recall.

Figure 2M:
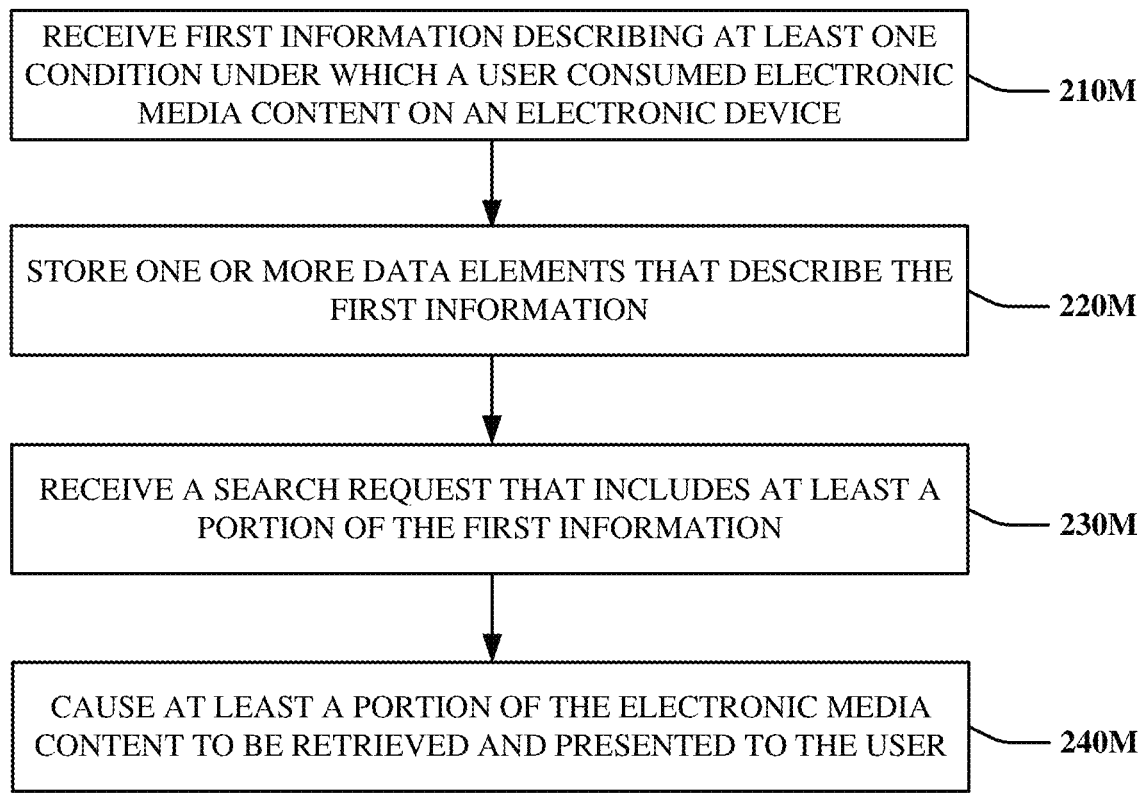
FIGS. 2M and 2N depicts illustrative embodiments of methods in accordance with various aspects described herein.

FIG. 2M depicts an illustrative embodiment of a method in accordance with various aspects described herein. At 210M of method 200M, first information describing at least one condition under which a user consumed electronic media content on an electronic device is received. In some embodiments, this corresponds to a media retrieval system receiving information from a user's electronic device regarding location, environmental conditions, or any other information available to be sensed or gathered by the electronic device. For example, mobile device 232A (FIG. 2A) may sense its location and a time at which electronic media content is being consumed by user 230A. Also for example, mobile device 232A may gather location data from another source such as a location-based application or social media. In general, the first information describing at least one condition under which a user consumed electronic media content may be sourced or gathered from any source and by any means.

At 220M, one or more data elements that describe the first information are stored. In some embodiments, this corresponds to the data elements that describe the first information being stored in a media consumption database such as media consumption database 222A (FIG. 2A). In other embodiments, one or more data elements may be a reference to a piece of content and the playback time (or chapter) within the content where the user last consumed this content. These data elements may be stored as a reference for future retrieval operations against the media consumption database 222A or as a link to a secondary media consumption server 220A that is federated (e.g. connected to the primary media consumption server 220A but without knowledge of the specific user timeline) and available for subsequent queries. At 230M, a search request that includes at least a portion of the first information is received. In some embodiments, this may correspond to a media consumption server such as media consumption server 200A receiving a search request provided by a user. Example search requests are described above with respect to FIGS. 2I-2L. The portion of the first information received with the search request may include any information describing at least one condition under which the user previously consumed electronic media on an electronic device. For example, a search request may include a time, location, or any other conditions sensed or gathered at the time that the user consumed the electronic media content on the electronic device. In another embodiment the search request at 230M may be sent to a federated media consumption server 220A, wherein the search request aggregates user conditions as one parcel of data and the specific content-based search criterion (e.g. keywords, topics, the title) as another parcel of data that is aggregated from a secondary media consumption server 220A or media consumption database 222A. In this embodiment, the secondary parcel of data is content-specific and therefore can be dynamically retrieved or updated after the original consumption time, date, and location. For example, a user may consume a tech talk about currency 210B in one year where a new term "WarnerCoin" has no definition. This term may be skipped or indexed with no initial value by the media consumption database 222A. However, when trying to search and retrieve information from the currency tech talk 210B in a year, the term "WarnerCoin" now refers to a deep, diverse currency that is popular in the field of devices like 236A and was referenced in subsequent media 210H in the buried treasure scene of 220H. If generated metadata was static, these additional search opportunities would be lost to the user; however, if the secondary media data was retrieved from a federated media consumption database 222A or server 220A, those content assets may continue to receive updates and therefore be discovered by the search step 230M. In a similar example, media metadata may not be created or available at the time of consumption of one or more pieces of content (e.g. 3D representations of characters, director's cut documentary, etc.) but it can be subsequently created, stored, and searched if these two components are accessible as federated contributors.

At 240M, at least a portion of the electronic media content is caused to be retrieved and presented to the user. In some embodiments, this corresponds to media consumption server 200A (FIG. 2A) causing media server 210A to re-present or replay the electronic media content on an electronic device of the user. In other embodiments, this may correspond to media consumption server 200A presenting electronic media content previously stored within media consumption database 222A.

Figure 2N:
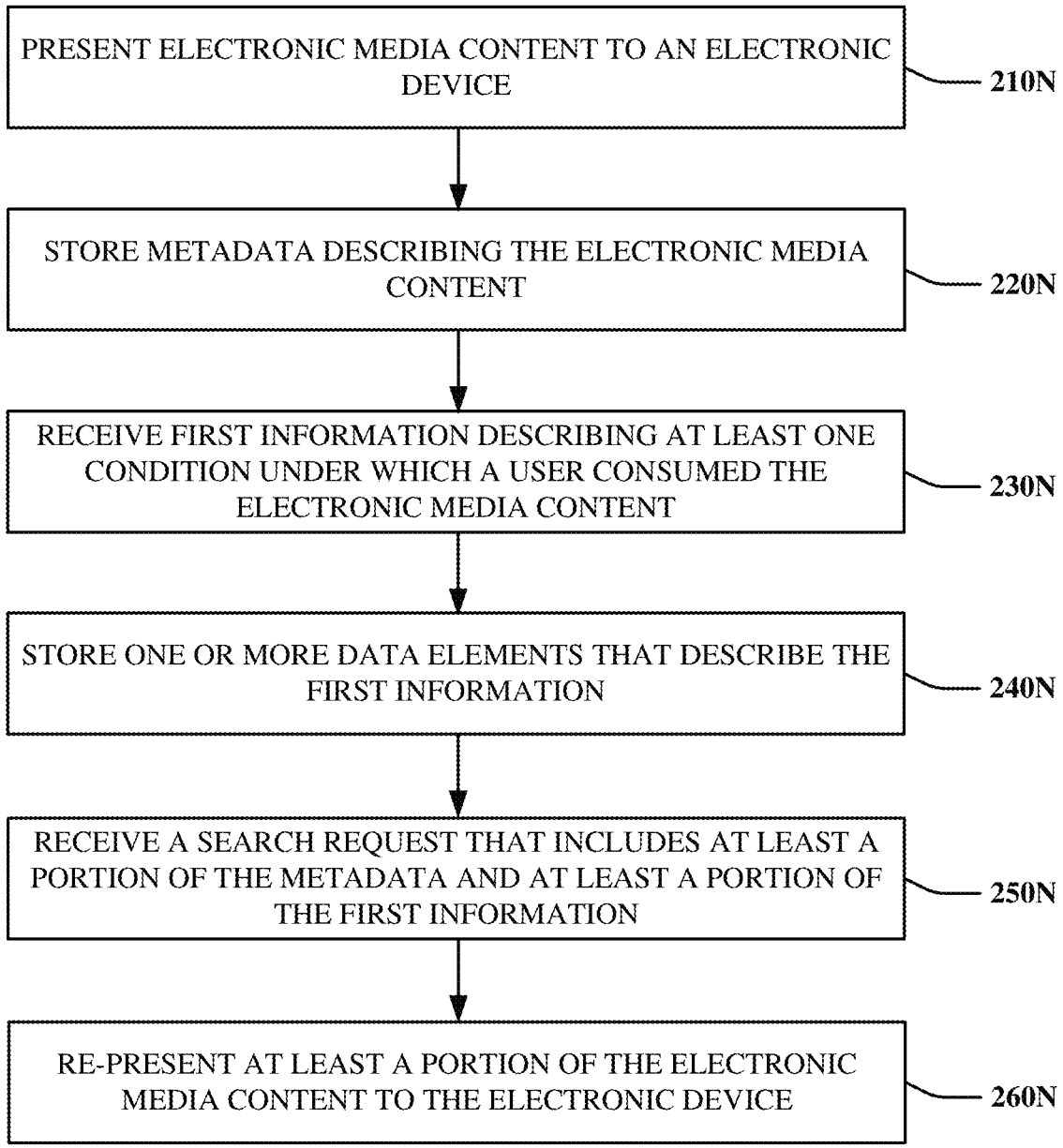

FIG. 2N depicts an illustrative embodiment of a method in accordance with various aspects described herein. At 210N of method 200N, electronic media content is presented to an electronic device. In some embodiments, this corresponds to a media server such as media server 210A (FIG. 2A) presenting electronic media content to an electronic device of a user such as user 230A. The electronic media content may be any type of media including for example stored video or audio, streaming video or audio, web pages, or the like. In some embodiments, the electronic media content is presented to the electronic device at the request of user 230A. For example, the user may be browsing a web page and click on a hyperlink which results in presentation of consumption of a video. The manner in which the electronic media content is requested or presented to the electronic device is not a limitation of the various embodiments.

At 220N, metadata describing the electronic media content is stored. In some embodiments, this corresponds to metadata being stored in media consumption data such as media consumption database 222A as described with reference previous figures. At 230N, first information describing at least one condition under which a user consumed electronic media content on an electronic device is received. In some embodiments, this corresponds to a media retrieval system receiving information from a user's electronic device regarding location, environmental conditions, or any other information available to be sensed or gathered by the electronic device. For example, mobile device 232A (FIG. 2A) may sense its location and a time at which electronic media content is being consumed by user 230A. Also for example, mobile device 232A may gather location data from another source such as a location-based application or social media. In general, the first information describing at least one condition under which a user consumed electronic media content may be sourced or gathered from any source and by any means.

At 240N, one or more data elements that describe the first information are stored. In some embodiments, this corresponds to the data elements that describe the first information being stored in a media consumption database such as media consumption database 222A (FIG. 2A). In other embodiments, one or more data elements may be a reference to a piece of content and the playback time (or chapter) within the content where the user last consumed this content. These data elements may be stored as a reference for future retrieval operations against the media consumption database 222A or as a link to a secondary media consumption server 220A that is federated (e.g. connected to the primary media consumption server 220A but without knowledge of the specific user timeline) and available for subsequent queries.

At 250N, a search request that includes at least a portion of the metadata and at least a portion of the first information is received. In some embodiments, this may correspond to a media consumption server such as media consumption server 200A receiving a search request provided by a user. Example search requests are described above with respect to FIGS. 2I-2L. The portion of the first information and the metadata received with the search request may include any metadata and any information describing at least one condition under which the user previously consumed electronic media on an electronic device. For example, a search request may include a time, location, or any other conditions sensed or gathered at the time that the user consumed the electronic media content on the electronic device. In another embodiment the search request at 250N may be sent to a federated media consumption server 220A, wherein the search request aggregates user conditions as one parcel of data and the specific content-based search criterion (e.g. keywords, topics, the title) as another parcel of data that is aggregated from a secondary media consumption server 220A or media consumption database 222A. In this embodiment, the secondary parcel of data is content-specific and therefore can be dynamically retrieved or updated after the original consumption time, date, and location. For example, a user may consume a tech talk about currency 210B in one year where a new term "WarnerCoin" has no definition. This term may be skipped or indexed with no initial value by the media consumption database 222A. However, when trying to search and retrieve information from the currency tech talk 210B in a year, the term "WarnerCoin" now refers to a deep, diverse currency that is popular in the field of devices like 236A and was referenced in subsequent media 210H in the buried treasure scene of 220H. If generated metadata was static, these additional search opportunities would be lost to the user; however, if the secondary media data was retrieved from a federated media consumption database 222A or server 220A, those content assets may continue to receive updates and therefore be discovered by the search step 250N. In a similar example, media metadata may not be created or available at the time of consumption of one or more pieces of content (e.g. 3D representations of characters, director's cut documentary, etc.) but it can be subsequently created, stored, and searched if these two components are accessible as federated contributors.

At 260N, at least a portion of the electronic media content is re-presented to the electronic device. In some embodiments, this corresponds to media consumption server 200A (FIG. 2A) causing media server 210A to re-present or replay the electronic media content on an electronic device of the user. In other embodiments, this may correspond to media consumption server 200A presenting electronic media content previously stored within media consumption database 222A.

While for purposes of simplicity of explanation, the respective processes are shown and described as a series of blocks in FIGS. 2M and 2N, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of FIGS. 2A-2L, and methods presented in FIGS. 2M and 2N. For example, virtualized communication network 300 can facilitate in whole or in part a media retrieval system that may include a media server and/or a media consumption server with associated media consumption database.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
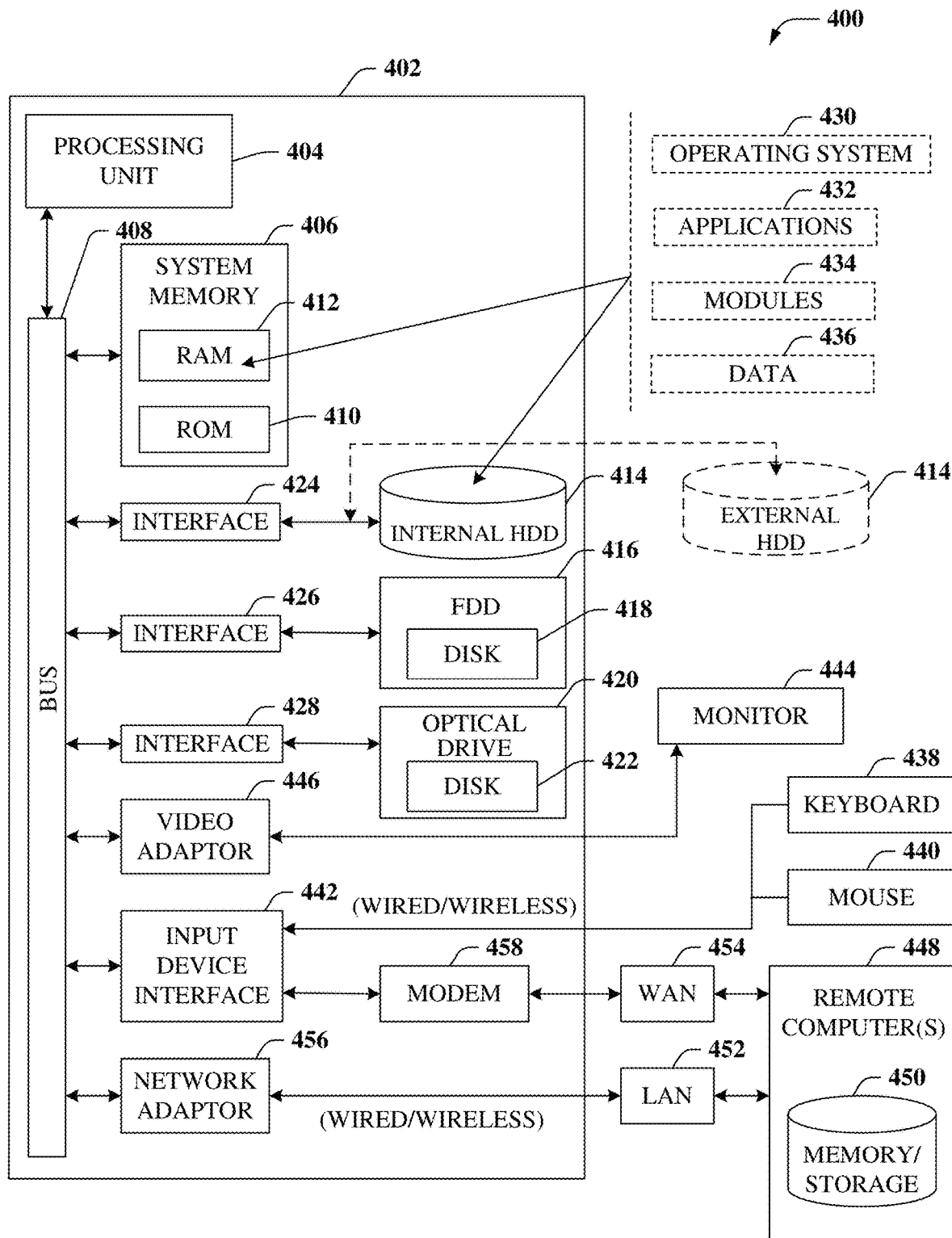
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part a media retrieval system that may include a media server and/or a media consumption server with associated media consumption database.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies.

Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
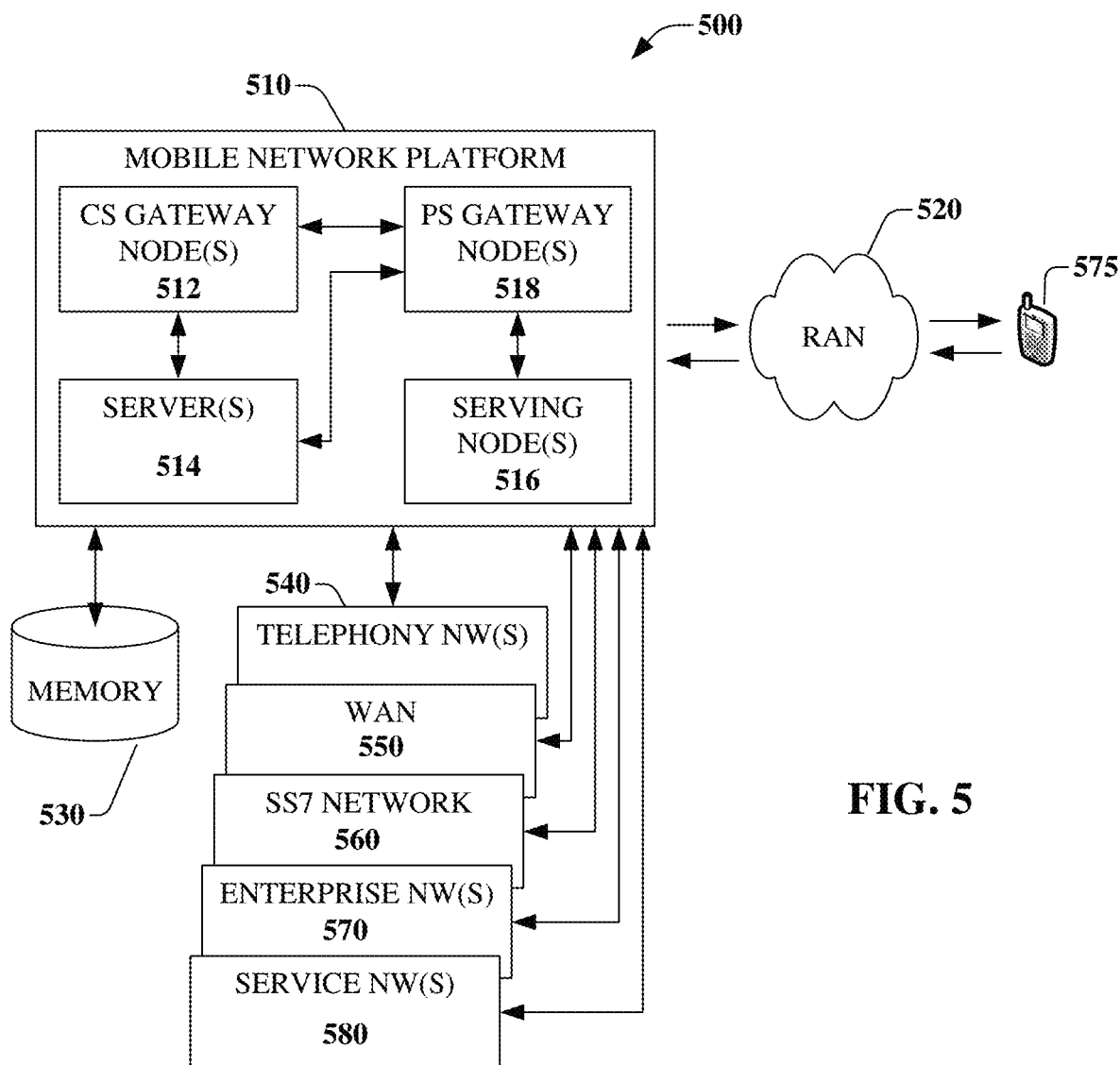
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part a media retrieval system that may include a media server and/or a media consumption server with associated media consumption database. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
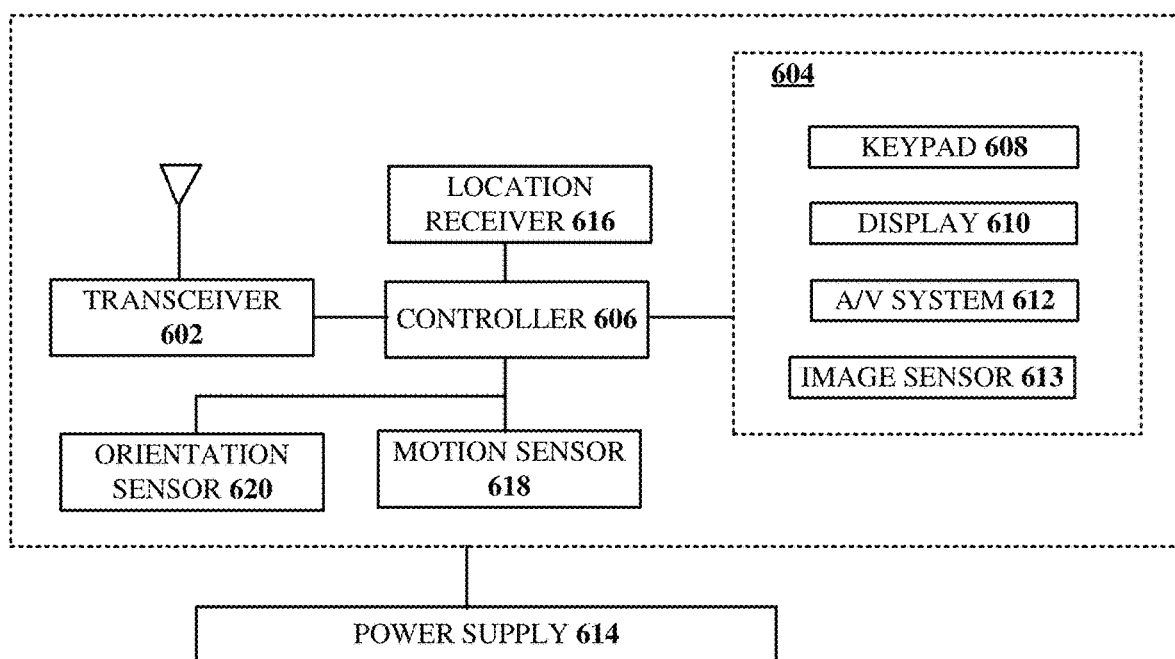
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part a media retrieval system that may include a media server and/or a media consumption server with associated media consumption database.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL- DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving a first media content from an electronic device of a user, the first media content having been recorded by the electronic device of the user in response to a first communication between the electronic device of the user and a shared electronic device presenting the first media content, resulting in consumption of the first media content;
receiving first information describing at least one condition under which the user consumed the first media content on the shared electronic device and the electronic device of the user that recorded the first media content, wherein the first information includes an identification of a second device of a second person proximate to the electronic device of the user during consumption of the first media content, and wherein the second device of the second person is detected by the electronic device of the user;
storing the first media content and one or more data elements that describe the first information;
receiving a search request from a first mobile device of the user, wherein the search request includes at least a portion of the first information and at least a portion of metadata describing the first media content, wherein the at least a portion of the first information includes the identification of the second device of the second person proximate to the electronic device of the user during the consumption of the first media content, wherein the metadata is specific to the first media content, wherein the metadata is, at least in part, generated and dynamically updated subsequent to the consumption of the first media content, resulting in updated metadata, wherein the search request aggregates the portion of the first information and the updated metadata, wherein the updated metadata includes a search criterion based on the first media content, and wherein the search request is generated according to a user speech interface via an application operated by the first mobile device;
receiving a modification to the portion of the first information according to previous search requests by the user to generate a modified search request; and
performing a federated search according to the modified search request to cause at least a portion of the first media content to be retrieved and presented to the user via the first mobile device.

2. The device of claim 1, wherein the metadata describing the first media content is updated in accordance with consumption of second media content subsequent to the consumption of the first media content, the second media content referencing the first media content.

3. The device of claim 1, wherein the federated search is based on the second device of the second person.

4. The device of claim 1, wherein the federated search is based on the identification of the second person.

5. The device of claim 1, wherein the electronic device of the user senses the second device of the second person according to a Blue Tooth™ capability of the electronic device of the user.

6. The device of claim 1, wherein the first information is derived from direct communication between the electronic device and another electronic device.

7. The device of claim 1, wherein the modifying the portion of the first information is further according to a pattern detected in the previous search requests.

8. The device of claim 1, wherein the first media content comprises a video presentation, and wherein the metadata is generated at least in part based on analysis of a video scene presented to the user.

9. The device of claim 1, wherein the one or more data elements are stored in a media consumption database in communication with a media consumption server.

10. A non-transitory machine-readable medium, comprising executable instructions that, when executed by a processing system including a processor, facilitate performance of operations, the operations comprising:
receiving a first media content from an electronic device of a user, the first media content having been recorded by the electronic device of the user in response to communication between the electronic device of the user and a shared electronic device presenting the first media content, resulting in consumption of the first media content;
receiving first information describing at least one condition under which the user consumed the first media content on the shared electronic device and the electronic device of the user that recorded the first media content, wherein the first information includes an identification of a second device of a second person proximate to the electronic device of the user during consumption of the first media content, and wherein the second device of the second person is detected by the electronic device of the user;
storing the first media content and one or more data elements that describe the first information;
receiving a search request from a first mobile device of the user, wherein the search request includes at least a portion of the first information and metadata describing the first media content, wherein the at least a portion of the first information includes the identification of the second device of the second person proximate to the electronic device of the user during the consumption of the first media content, wherein the metadata is specific to the first media content, wherein the metadata is, at least in part, generated and dynamically updated subsequent to the consumption of the first media content, resulting in updated metadata, wherein the search request aggregates the portion of the first information and the updated metadata, wherein the updated metadata includes a search criterion based on the first media content, and wherein the search request is generated according to a user speech interface via an application operated by the first mobile device;
receiving a modification to the portion of the first information according to previous search requests by the user to generate a modified search request; and
performing a federated search according to the modified search request to cause at least a portion of the first media content to be retrieved and presented to the user via the first mobile device.

11. The non-transitory machine-readable medium of claim 10, wherein the metadata describing the first media content is updated in accordance with consumption of second media content subsequent to the consumption of the first media content, the second media content referencing the first media content.

12. The non-transitory machine-readable medium of claim 10, wherein the first information includes location information sensed by the electronic device.

13. The non-transitory machine-readable medium of claim 12, wherein the location information is retrieved from a location-based application.

14. The non-transitory machine-readable medium of claim 10, wherein the first information is provided at least in part by a social media service.

15. The non-transitory machine-readable medium of claim 10, wherein the first information is derived from direct communication between the electronic device and another electronic device.

16. The non-transitory machine-readable medium of claim 10, wherein the first information includes a timestamp.

17. The non-transitory machine-readable medium of claim 10, wherein the first media content comprises a video presentation, and wherein the metadata is generated at least in part based on analysis of a video scene presented to the user.

18. The non-transitory machine-readable medium of claim 10, wherein the one or more data elements are stored in a media consumption database in communication with a media consumption server, and wherein the federated search is performed amongst the media consumption server which may get updates from other locations.

19. A method comprising:
receiving, by a processing system including a processor, a first media content from an electronic device of a user, the first media content having been recorded by the electronic device of the user in response to communication between the electronic device of the user and a shared electronic device presenting the first media content, resulting in consumption of the first media content;
receiving, by the processing system, first information describing at least one condition under which the user consumed the first media content on the shared electronic device and the electronic device of the user that recorded the first media content, wherein the first information includes an identification of a second device of a second person proximate to the electronic device of the user during consumption of the first media content, and wherein the second device of the second person is detected by the electronic device of the user;
storing, by the processing system, the first media content and one or more data elements that describe the first information;
receiving, by the processing system, a search request from a first mobile device of the user, wherein the search request includes at least a portion of the first information and metadata describing the first media content, wherein the at least a portion of the first information includes the identification of the second device of the second person proximate to the electronic device of the user during the consumption of the first media content, wherein the metadata is specific to the first media content, wherein the metadata is, at least in part, generated and dynamically updated subsequent to the consumption of the first media content, resulting in updated metadata, wherein the search request aggregates the portion of the first information and the updated metadata, wherein the updated metadata includes a search criterion based on the first media content, and wherein the search request is generated according to a user speech interface via an application operated by the first mobile device;
receiving a modification, by the processing system, to the portion of the first information according to previous search requests by the user to generate a modified search request; and
performing, by the processing system, a federated search according to the modified search request to cause at least a portion of the first media content to be retrieved and presented to the user via the first mobile device.

20. The method of claim 19, wherein the metadata describing the first media content is updated in accordance with consumption of second media content subsequent to the consumption of the first media content, the second media content referencing the first media content.

* * * * *